US012701013B2

(12) United States Patent
Kodam et al.

(10) Patent No.: US 12,701,013 B2
(45) Date of Patent: Aug. 4, 2026

(54) MEDIA SHARING PLATFORM

(71) Applicant: DISH Network L.L.C., Englewood, CO (US)

(72) Inventors: Sheshank Kodam, Aurora, CO (US); Rima Shah, Broomfield, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/809,186

(22) Filed: Aug. 19, 2024

(65) Prior Publication Data

US 2024/0412174 A1 Dec. 12, 2024

Related U.S. Application Data

(63) Continuation of application No. 16/141,737, filed on Sep. 25, 2018, now Pat. No. 12,079,782.

(51) Int. Cl.

| | |
|---|---|
| *G06Q 20/06* | (2012.01) |
| *G06F 16/23* | (2019.01) |
| *G06Q 10/40* | (2026.01) |
| *G06Q 30/06* | (2023.01) |
| *H04L 9/06* | (2006.01) |
| *G06Q 30/0645* | (2023.01) |
| *H04L 9/00* | (2022.01) |

(52) U.S. Cl.
CPC ......... *G06Q 20/06* (2013.01); *G06F 16/2379* (2019.01); *G06Q 10/40* (2026.01); *H04L 9/0637* (2013.01); *G06Q 30/0645* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 7,653,552 | B2 | 1/2010 | Vaidyanathan et al. |
| 9,430,791 | B1 | 8/2016 | Sutton-Shearer |
| 2015/0319115 | A1 | 11/2015 | Cudak et al. |

(Continued)

FOREIGN PATENT DOCUMENTS

| | | | | |
|---|---|---|---|---|
| WO | WO-2011097624 A2 | * | 8/2011 | ......... G06Q 30/0242 |
| WO | 2019021048 A1 | | 1/2019 | |
| WO | 2019221736 A1 | | 11/2019 | |

OTHER PUBLICATIONS

Ferri, M., "Rent, buy, or pirate: Consumer preferences in the movie industry", The University of Chicago, Proquest LLC, UMI No. 3568535, Jun. 2013. (Year: 2013).*

(Continued)

*Primary Examiner* — Clay C Lee

(74) *Attorney, Agent, or Firm* — Perkins Coie LLP

(57) ABSTRACT

Disclosed is a social networking system that allows a user of the social networking system to share media content with other users of the social networking system. A user can buy media content, e.g., a movie, offered in the social networking system by a content originator, who is a producer of the media content, or a content provider, who is a distributor or provider of the media content. The user can then share the media content with other users of the social networking system. For example, the user may sell or rent the movie bought by the user to friends of the user in the social networking platform. Further, the user may sell or rent the media content for profit.

20 Claims, 10 Drawing Sheets

(56) References Cited

U.S. PATENT DOCUMENTS

| | | | |
|---|---|---|---|
| 2016/0050446 A1 | 2/2016 | Fujioka et al. | |
| 2016/0323109 A1* | 11/2016 | McCoy | G06Q 10/40 |
| 2017/0063772 A1* | 3/2017 | Bapat | G06Q 10/40 |
| 2017/0091843 A1 | 3/2017 | Zeigler et al. | |
| 2017/0364860 A1 | 12/2017 | Wilkinson et al. | |
| 2018/0232817 A1* | 8/2018 | Isaacson | G06Q 10/40 |
| 2020/0097926 A1 | 3/2020 | Kodam | |

OTHER PUBLICATIONS

Ferri, Mickey. "Rent, buy, or pirate: Consumer preferences in the movie industry", ProQuest Dissertations and Theses, ProQuest Dissertations Publishing. (2013) (Year: 2013).

* cited by examiner

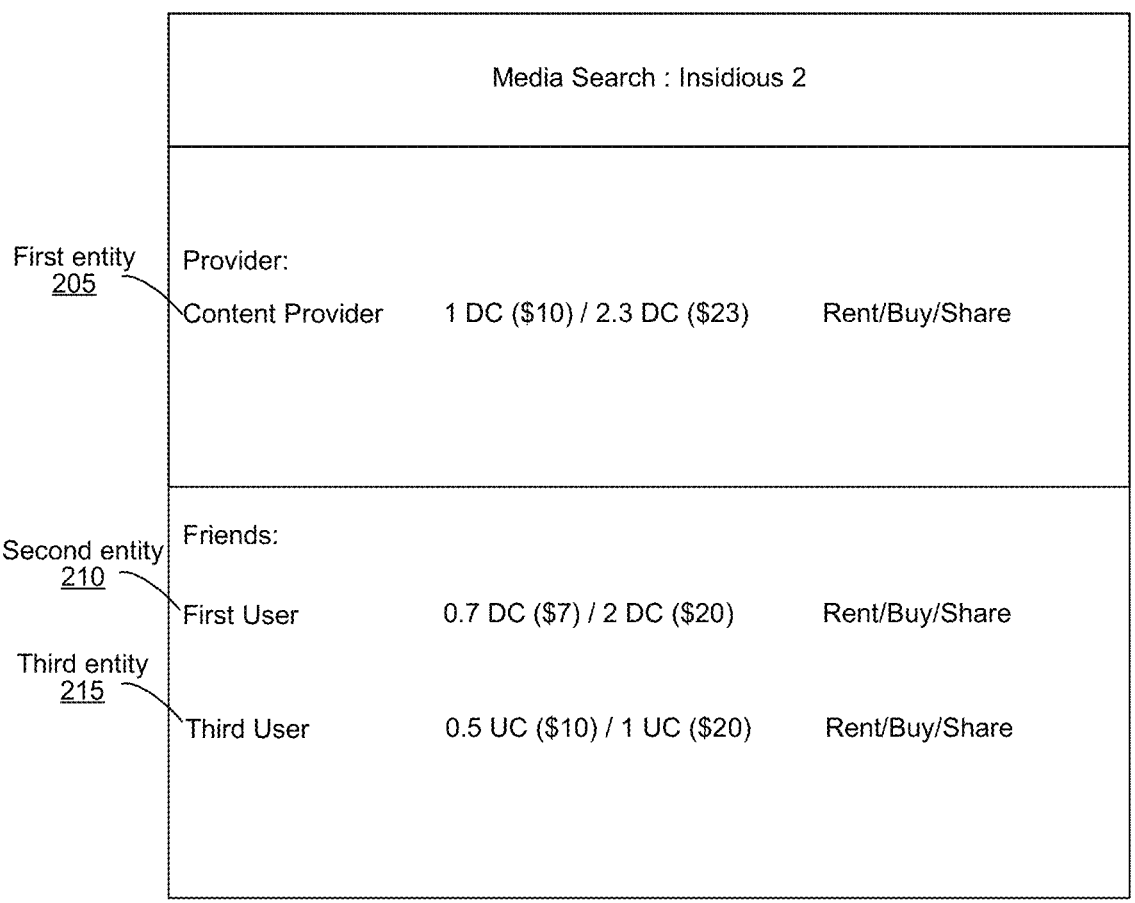
FIG. 2

Social Networking System 105

Data Transceiver Component
505

Media Search Component
510

Media Access Component
515

Blockchain Management Component
520

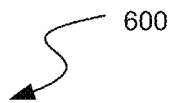

600

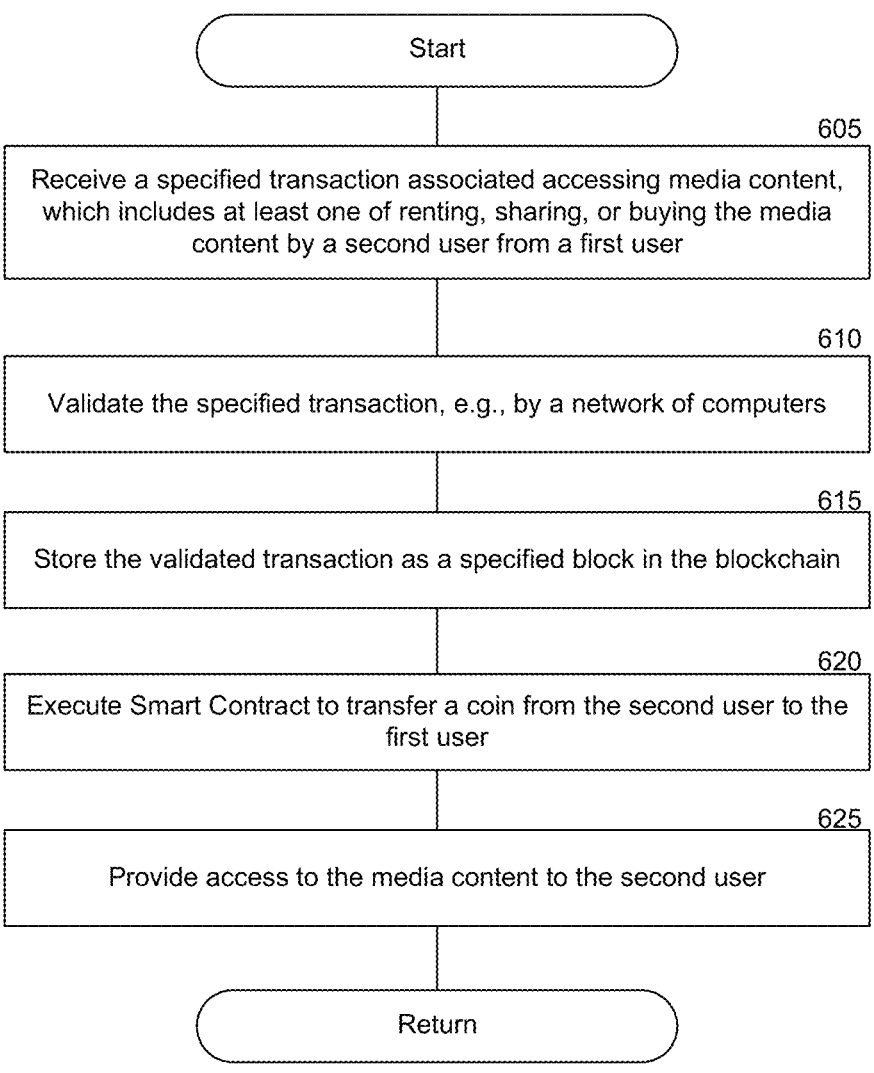

Start

605

Receive a specified transaction associated accessing media content, which includes at least one of renting, sharing, or buying the media content by a second user from a first user

610

Validate the specified transaction, e.g., by a network of computers

615

Store the validated transaction as a specified block in the blockchain

620

Execute Smart Contract to transfer a coin from the second user to the first user

625

Provide access to the media content to the second user

Return

*FIG. 6*

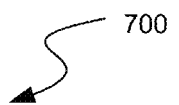

700

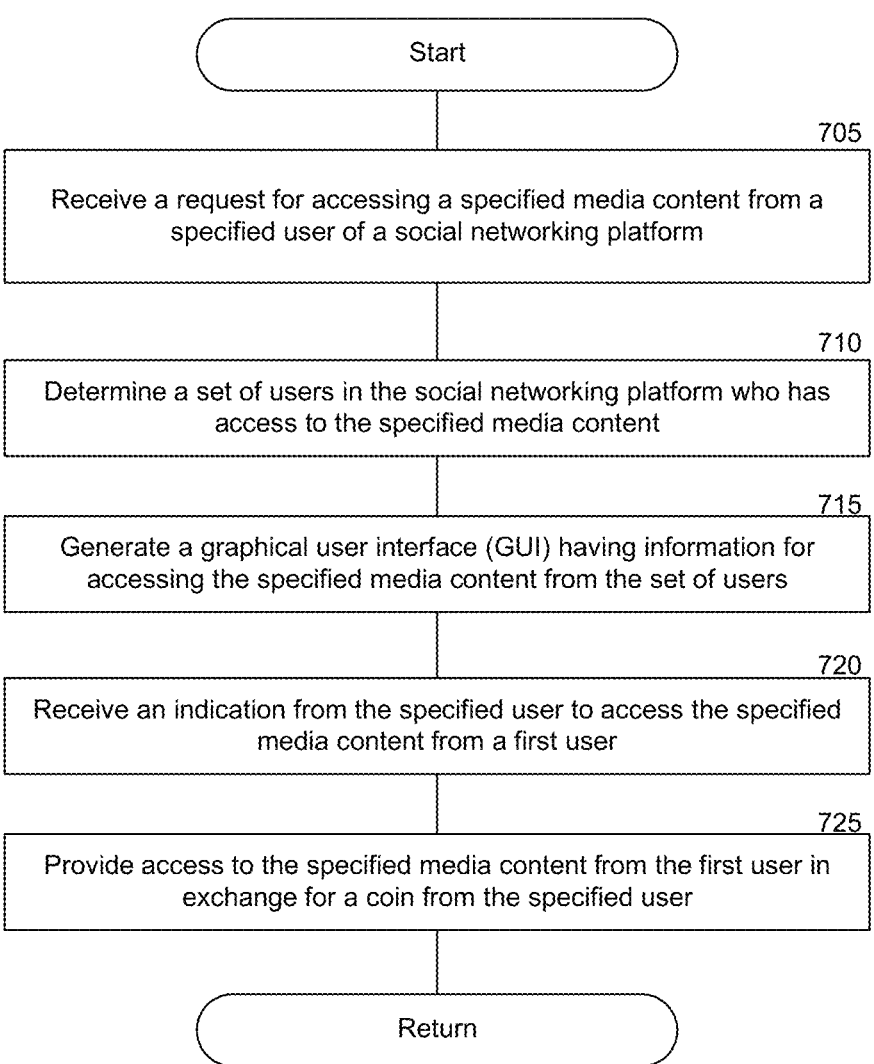

Start

705

Receive a request for accessing a specified media content from a specified user of a social networking platform

710

Determine a set of users in the social networking platform who has access to the specified media content

715

Generate a graphical user interface (GUI) having information for accessing the specified media content from the set of users

720

Receive an indication from the specified user to access the specified media content from a first user

725

Provide access to the specified media content from the first user in exchange for a coin from the specified user Return

*FIG. 7*

MEDIA SHARING PLATFORM

CROSS-REFERENCE TO RELATED APPLICATION

This application is a continuation of U.S. patent application Ser. No. 16/141,737, filed Sep. 25, 2018, entitled "MEDIA SHARING PLATFORM," which is incorporated by reference in its entirety.

BACKGROUND

Media Providers and Studios provide various subscription models for watching media content. For example, a media provider such as HBO may provide a streaming service to which users can subscribe to watch television (TV) shows, movies etc. In another example, media providers provide media content over a television broadcasting network to which the users can subscribe. These models require a user to subscribe to a service to watch the media content. However, if the viewer is just interested in watching a particular media content without subscribing to the service, the viewer may not be able to do so as the media provider may not the make the particular media content available for consumption without subscribing to the service. Accordingly, the current subscription services may not cater to user's interests in specific media content. Further, the current subscription services do not have the infrastructure or capabilities for letting the users share media content with other users.

BRIEF DESCRIPTION OF THE DRAWINGS

FIG. 2 is an example graphical user interface (GUI) of a social networking system for sharing media content with users of the social networking system, consistent with various embodiments.

FIG. 6 is a flow diagram of a process for managing access transactions associated with sharing a media content using a blockchain, consistent with various embodiments.

FIG. 7 is a flow diagram of a process for sharing access to media content with users of the social networking system, consistent with various embodiments.

DETAILED DESCRIPTION

Figure 1:
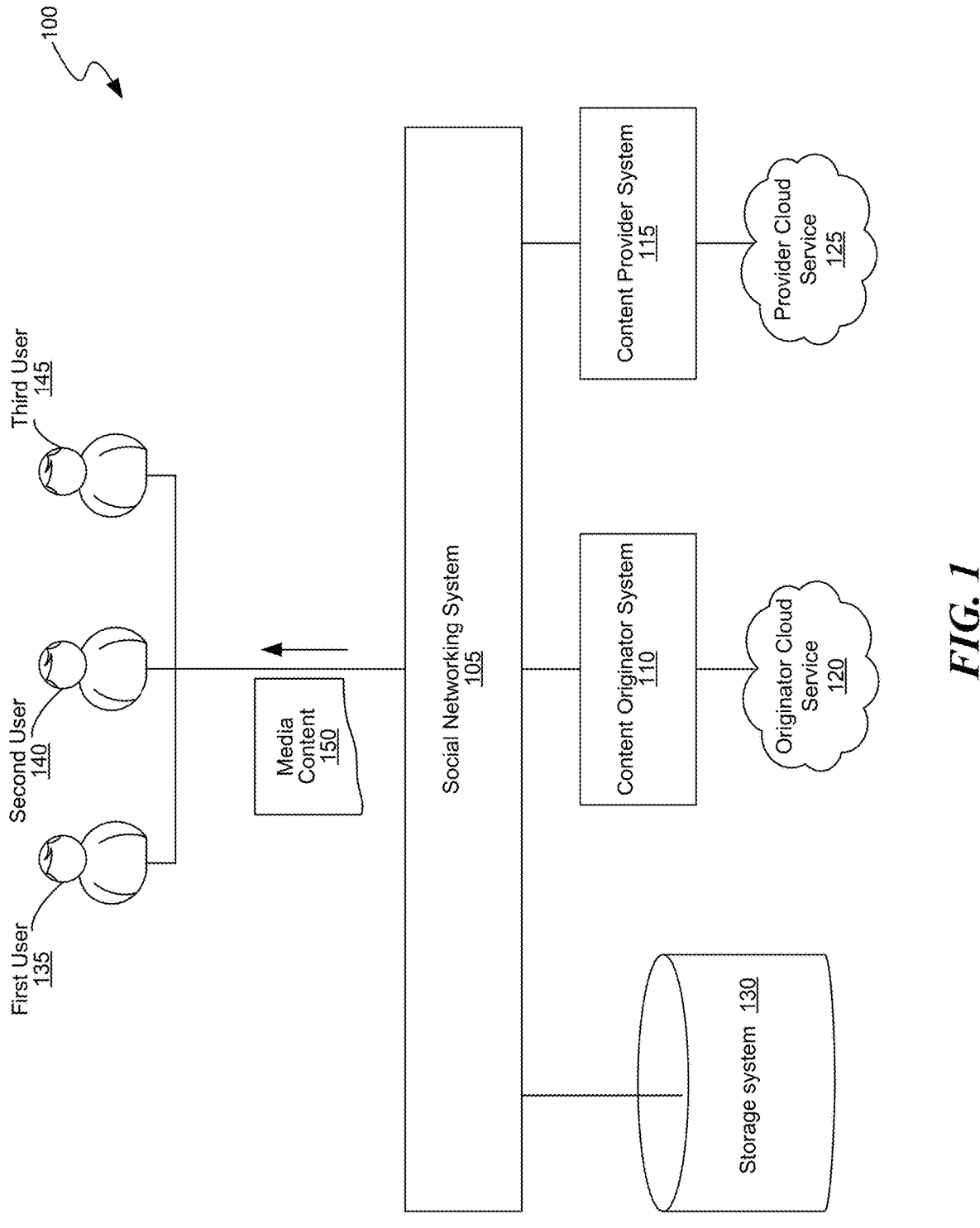
FIG. 1 is a block diagram of an environment in which the disclosed embodiments can be implemented.

Embodiments are directed to a social networking system that allows a user of the social networking system to share media content with other users of the social networking system. A user can buy media content, e.g., a movie, offered in the social networking system by a content originator, who is a producer of the media content, or a content provider, who is a distributor or provider of the media content. The user can then share the media content with other users of the social networking system. For example, the user may sell or rent the movie bought by the user to friends of the user in the social networking platform. Further, the user may sell or rent the media content for profit.

The social networking system provides a graphical user interface (GUI) using which a user can search for media content. When a specified user searches for a specified media content, the GUI can generate a list of entities who can provide access to the specified media content. The entities can include a set of users who can be friends of the specified user in the social networking system. The entities can also include at least one of a content provider or a content originator who can provide access to the specified content. The list can also specify an access type, e.g., rent, share or buy, provided by each of the entities for the specified media content. The specified user can obtain access to the specified media content from any of the entities. Each entity, that is, the content originator, content provider and each user from the set of users, can specify a price associated with an access type. In some embodiments, the price of obtaining access to the specified media content from any of the set of users is lower than that of obtaining from the content provider or the content originator. The specified user can choose the entity from the list and obtain access to the specified media content accordingly. In some embodiments, for a user to share the media content with another user, the user should have bought the media content from the content originator or the content provider, and any profit generated by the user in sharing the media content with other users is shared with at least one of the content provider or the content originator.

In some embodiments, the social networking system uses blockchain technology to manage transactions associated with sharing the media content. When a transaction, such as a first user obtaining access to the specified media content from a second user, takes place the social networking platform validates the transaction using the blockchain technology and adds the validated transaction to the blockchain as a new block and links the new block to the last added block of the blockchain. In some embodiments, a separate blockchain is generated for each media content. By analyzing the blockchain, a content provider and/or the content originator can track all transactions associated with sharing the specified media content. The content provider can determine which entities shared the specified media content with which entities, the price at which it was shared, and the currency flow between the entities for such transactions.

In some embodiments, payments for sharing of the media content is made using a coin, e.g., cryptocurrency. Further, different types of cryptocurrencies can be used by different entities. For example, the content provider can accept a first type of crypto currency and a content originator can accept a second type of cryptocurrency.

Turning now to FIG. 1, FIG. 1 is a block diagram of an environment 100 in which the disclosed embodiments can be implemented. The environment 100 includes a social networking system 105, which a content originator or a content provider can use to provide content 150 for consumption by users of the social networking system 105, such as a first user 135, a second user 140 and a third user 145. The content 150 can be any media content, such as TV shows, movies, documentaries, web series. A content originator can be any entity, e.g., movie studios and producers, that generates the content 150. A content originator system 110 can include one or more devices, services, software, or a combination thereof that the content originator uses to make the content 150 available to the users of the social networking system 105 and the content provider. The content originator system 110 is associated with an originator cloud service 120, which is a storage device or a storage service, such as a cloud storage service, used to store various media content generated by the content originator.

A content provider can be any entity, e.g., a movie studio, media broadcaster, producer, distributor, streaming service, that distributes the content 150 to the users. A content provider system 115 can include one or more devices, services, software, or a combination thereof that the content provider uses to distribute the content 150. The content provider system 115 is associated with a provider cloud service 125, which is a storage device or a storage service such as a cloud storage service, used to store various media content provided by the content provider.

The users can consume the content 150 using a variety of devices, e.g., a TV, a computer, a desktop, a laptop, a smartphone, a tablet PC.

The social networking system 105 allows the users to consume media content provided by the content originator system 110 or the content provider system 115 and share the media content with other users of the social networking system 105. A user, e.g., the first user 135, can become a member of the social networking system 105 by registering with the social networking system 105. The registration process may require the first user 135 to provide user information, such as name, age, sex, work and/or home address, interests, hobbies, all of which can be stored as a user profile in a storage system 130 associated with the social networking system 105. The first user 135 can also connect with other users of the social networking system 105. For example, the first user 135 can become friends with or follow other users, e.g., second user 140 and third user 145.

The users can also access various media content, e.g., the media content 150 such as a movie, in the social networking system 105. The media content may be made available to the users by one or more entities, e.g., a content originator, a content provider or other users, e.g., friends of the users. For example, the second user 140 can obtain access to the media content in the social networking system 105 through the content originator, content provider, or one or more friends of the second user 140 such as the first user 135 or the third user 145. The social networking system 105 provides a GUI for searching and accessing media content.

FIG. 2 is an example GUI 200 of the social networking system for sharing media content with users of the social networking system, consistent with various embodiments. In the GUI 200, the second user 140 searches for the media content 150 (e.g., a movie "Insidious"). The GUI 200 generates a list of entities who can provide access to the media content 150 to the second user 140. A first entity 205 who can provide access to the media content 150 to the second user 140 is a content provider, a second entity 210 is the first user 135 who is a friend of the second user 140, and a third entity 215 is the third user 145 who is also a friend of the second user 140.

The list also indicates the different types of access the entities provide for accessing the movie. For example, all the three entities provide three different types of access—rent (R), buy (B) and share(S). In some embodiments, rent is a type of access in which the rented media content 150 is accessible by a user for a specified period, specified number of times etc. For example, a rented media content may be accessible by the user for a day, a week, a fortnight etc. from the time of renting. In some embodiments, buy is a type of access in which the bought media content 150 is owned by the user and is accessible for an indefinite period. Further, in some embodiments, the rented media content may be accessible via online streaming but not downloadable by the user whereas the bought media content may be accessible via online streaming and downloadable by the user. Different entities can provide different types of access. While the GUI 200 illustrates all entities providing all types of access, all entities may not provide all types of access. For example, while the first user 135 provides three different types of access, the third user 145 may provide only one or two types of access. Such determination of the available access types may be based on user-defined criterion, e.g., criterion defined by the content provider or the content originator. For example, the content provider can specify that while all subscribers of the content provider can rent media content only premium subscribers of the content provider can rent and sell the media content.

The list also indicates a price associated with different types of access. The price can be in fiat currency or a coin e.g., cryptocurrency. Further, different entities can provide access to the media content 150 at different prices. For example, the first entity 205 indicates that the content provider can rent the media content 150 to the second user 140 at "1 DC," which is equivalent to "$10" in fiat currency, and sell the media content 150 at "2.3 DC," which is equivalent to "$23" in fiat currency. In another example, the second entity 210 indicates that the first user 135 can rent the media content 150 at "0.7 DC," which is equivalent to "$7" in fiat currency, and sell the media content 150 at "2 DC," which is equivalent to "$20" in fiat currency. In another example, the second entity 210 indicates that the third user 145 can rent the media content 150 at "0.5 UC," which is equivalent to "$10" in fiat currency, and sell the media content 150 at "1 UC," which is equivalent to "$20" in fiat currency. In some embodiments, "DC" is a first type of cryptocurrency, which is associated with the content provider (e.g., an initial coin offering by the content provider) and "UC" is a second type of cryptocurrency, which is associated with the content originator (e.g., an initial coin offering by the content originator).

Some users of the social networking system 105 can be subscribers of broadcast service/streaming service of the content provider. Such users or users who have bought the media content 150 from the content provider or from another user who sold the media content 150 using the first type of cryptocurrency can further rent/sell/share the media content 150 to other users using the first type of cryptocurrency. In some embodiments, if a user has bought the content from the content originator using the second type of cryptocurrency, the user can rent/sell/share the media content 150 to other users using the second type of cryptocurrency. In the example GUI 200, third user 145 has bought the media content 150 from the content originator.

Referring back to the access type, a third type of access is "share," in which the cost of renting or buying the content is shared with another user. For example, the second user 140 can choose to share the cost ("0.7DC") of renting the media content 150 from the first user 135 with a fourth user. The cost sharing can be equal or a user-defined proportion. Further, the cost of access to the media content 150 can be shared between more than two users.

As can be appreciated, the example GUI 200 provides various options for the second user 140 to obtain access to the media content 150 and from one or more entities. The social networking system 105 also allows the users to post reviews/comments on the media content 150, which can be viewed by other users, e.g., friends of the posting user. A user may be motivated to rent or buy a particular media content upon reading the reviews/comments. In some embodiments, when a user, e.g., the first user 135, watches a particular media content, the social networking system 105 may send a notification to other users, e.g., friends of the first user 135 such as the second user 140, that the first user 135 watched and/or liked the particular media content. The notification may also include an option for renting, buying or sharing the movie from the first user 135.

Figure 3:
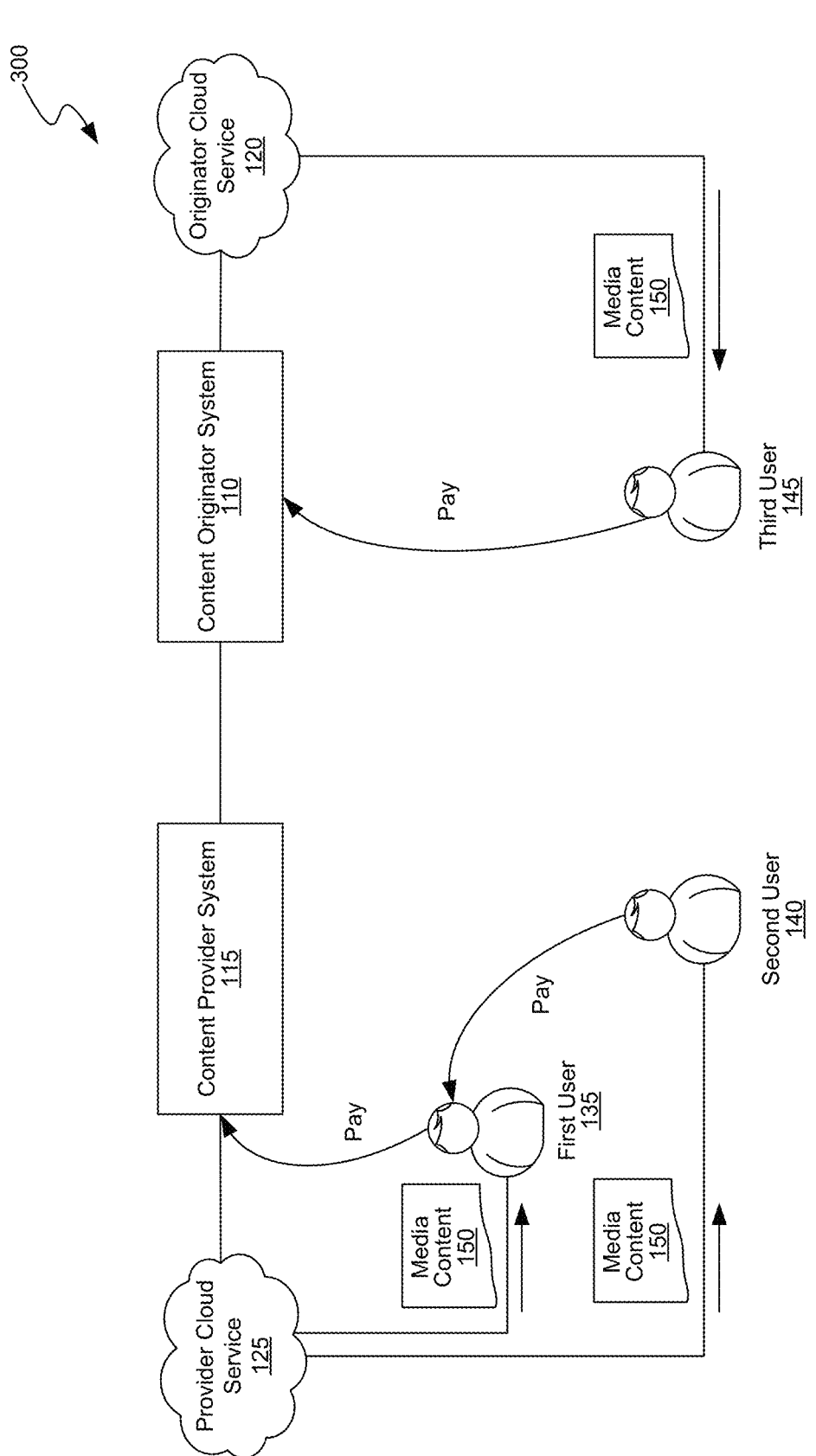
FIG. 3 is a block diagram of an example illustrating transactions performed in sharing media content with the users of the social networking system, consistent with various embodiments.

FIG. 3 is a block diagram of an example 300 illustrating transactions performed in sharing media content with the users of the social networking system, consistent with various embodiments. As described above at least with reference to FIG. 2, a user of the social networking system 105 can obtain access to the media content 150 from another user, content originator or the content provider in the social networking system 105. In the example 300, the third user 145 chooses to obtain access to the media content 150 from the content originator. The third user 145 can rent or buy the media content 150 from the content originator. The content originator system 110 may require the payment for accessing the media content 150 be made in terms of a cryptocurrency, such as "UC." Upon receiving the payment from the third user 145 for the chosen access type, the content originator system 110 authorizes the third user 145 to access the media content 150. In some embodiments, the content originator system 110 can send a link to the third user 145 using which the third user 145 can access the media content 150. Upon accessing the link, the media content 150 can be streamed or downloaded from the originator cloud service 120.

In the example 300, the first user 135 chooses to obtain access to the media content 150 from the content provider. The first user 135 can rent or buy the media content 150 from the content provider. The content provider system 115 may require the payment for accessing the media content 150 be made in terms of a cryptocurrency, such as "DC." Upon receiving the payment from the first user 135 for the chosen access type, the content provider system 115 authorizes the first user 135 to access the media content 150. In some embodiments, the content provider system 115 can send a link to the first user 135 using which the first user 135 can access the media content 150. Upon accessing the link, the media content 150 can be streamed or downloaded by the first user 135 from the provider cloud service 125.

In the example 300, the second user 140 chooses to obtain access to the media content 150 from the first user 135. The second user 140 can rent or buy the media content 150 from the first user 135. The first user 135 may require the payment for accessing the media content 150 be made in terms of a cryptocurrency, such as "DC." In some embodiments, the type of coin a specified user accepts for providing access to a specified media content can depend on who the specified media content was originally bought from, e.g., the content provider or the content originator. In the example 300, since the first user 135 bought the media content from the content provider, the payment accepted by the first user 135 can be in the form of a coin specific to the content provider. Upon the first user 135 receiving the payment from the second user 140 for the chosen access type, the content provider system 115 authorizes the second user 140 to access the media content 150. In some embodiments, the content provider system 115 can send a link to the second user 140 using which the second user 140 can access the media content 150. Upon accessing the link, the media content 150 can be streamed or downloaded by the second user 140 from the provider cloud service 125.

In some embodiments, a payment received, or a profit made by a specified user of the social networking system 105 in providing access to the media content 150 to other users of the social networking system 105 can be shared with at least one of the content originator or the content provider. For example, any profit made by the first user 135 is renting or selling the access to the media content 150 is shared with the content provider. In some embodiments, the content provider may have to further share such a profit with the content originator if the content provider purchased the media content 150 from the content originator. The amount of profit to be shared between the entities can be user-defined. For example, if the first user 135 sells the media content 150 at "2 DC," then the content provider may get "0.5 DC," "1 DC," or "1.2 DC."

Figure 4A:
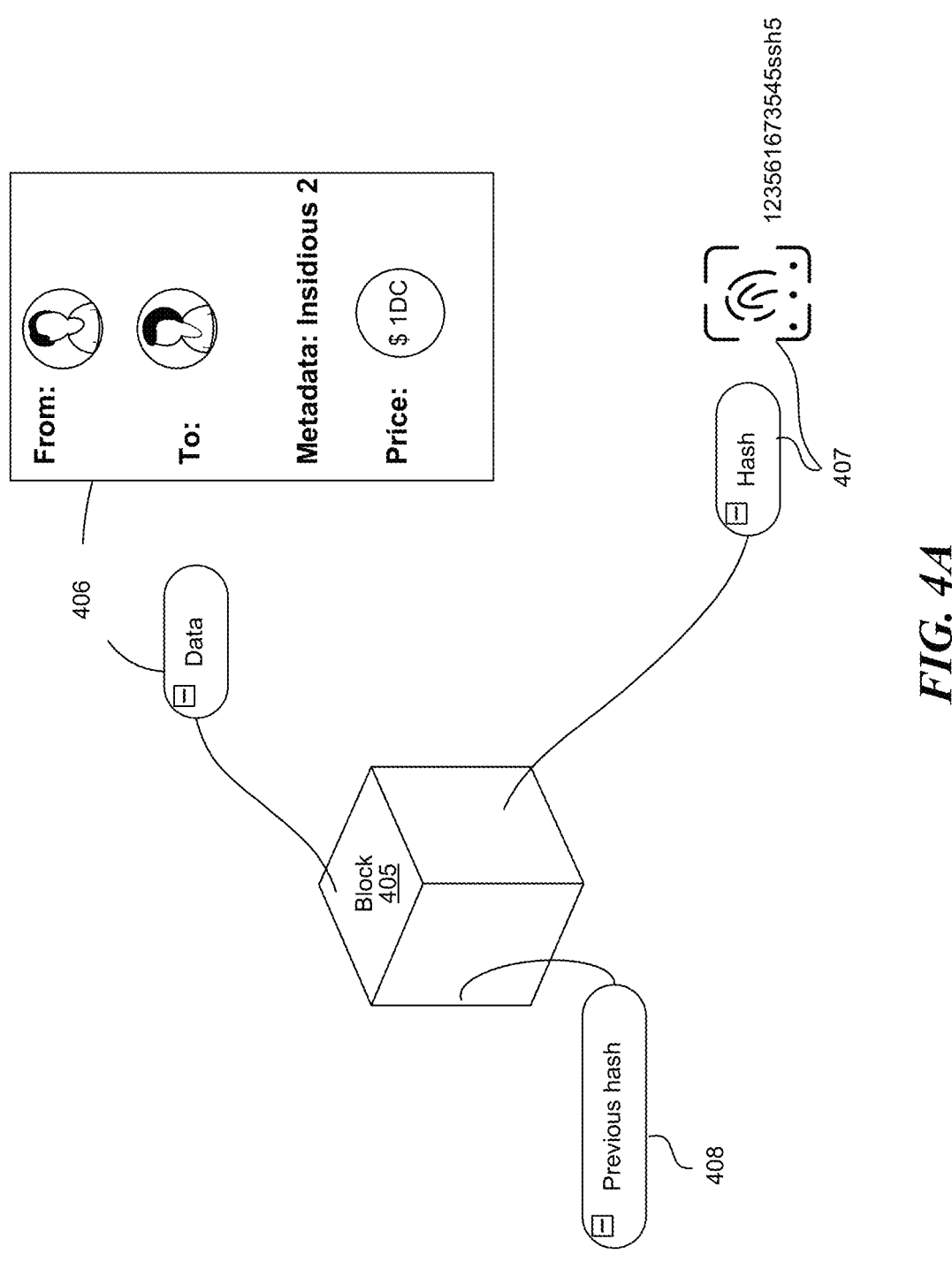
FIG. 4A is a block diagram of a block of a blockchain, consistent with various embodiments.
Figure 4B:
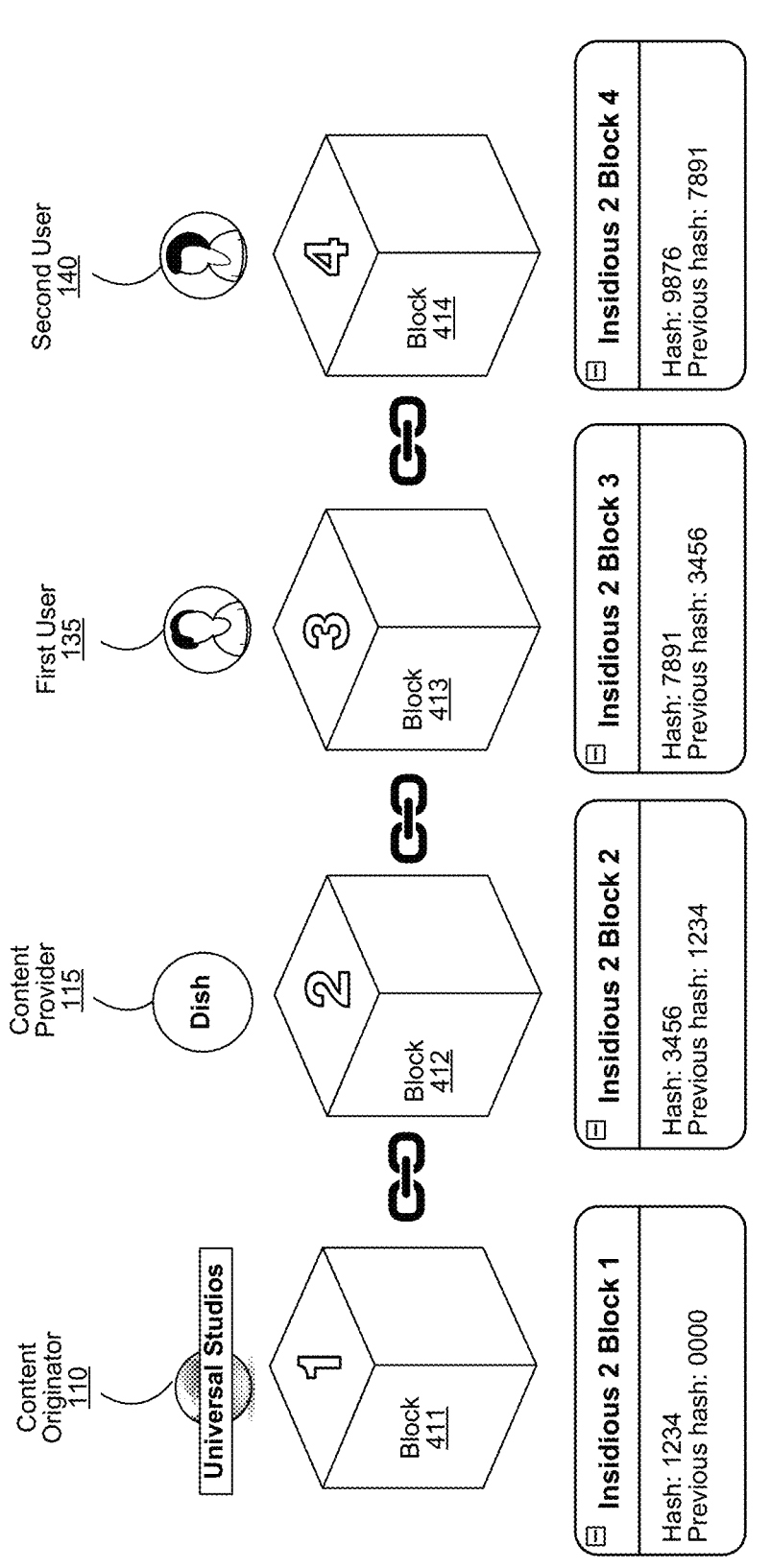
FIG. 4B is a block diagram of a blockchain used to manage access transactions of a media content in the social networking system, consistent with various embodiments.
Figure 4C:
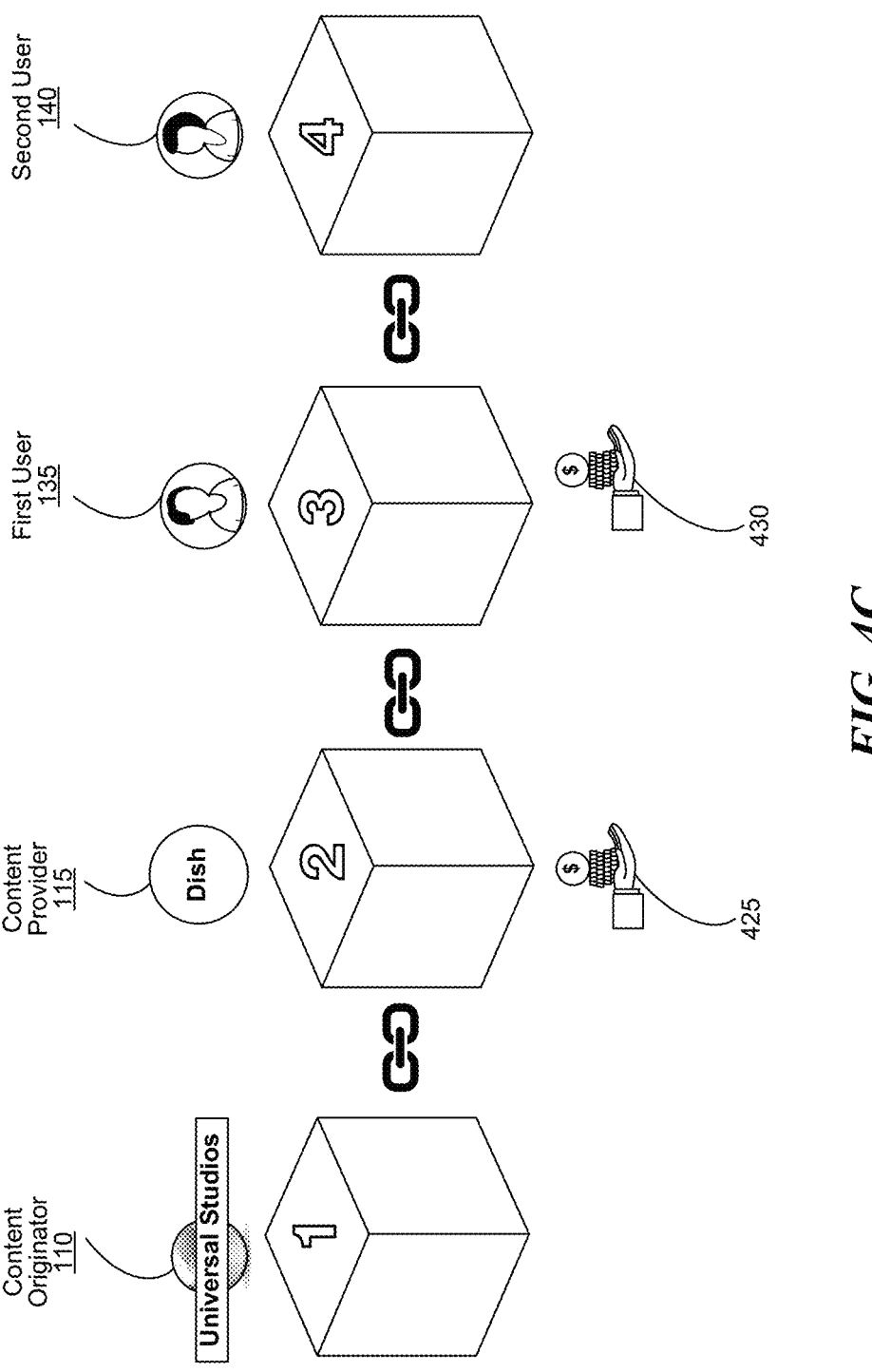
FIG. 4C is a block diagram of the blockchain illustrating payments made for obtaining access to media content, consistent with various embodiments.

The social networking system 105 can use blockchain technology to manage the transactions corresponding to access sharing of the media content, e.g., as illustrated in FIGS. 4A-4C.

FIG. 4A is a block diagram of a block of a blockchain, consistent with various embodiments. In some embodiments, a blockchain is a continuously growing list of records, called blocks such as a block 405, which are linked and secured using cryptography. Each block typically contains a cryptographic hash, such as a hash 407 of the block 405 and a previous hash 408 of the previous block, a timestamp, and transaction data such as transaction data 406. By design, a blockchain is inherently resistant to modification of the data. It is an open, distributed ledger that can record transactions between two parties efficiently and in a verifiable and permanent way. Once recorded, the data in any given block cannot be altered retroactively without the alteration of all subsequent blocks. The transaction data 406 includes information such as (a) metadata of media content that is being shared, (b) an ID of a user from who the access to the media content is provided, (c) an ID of a user to whom the access to the media content is provided, and (d) price of the access type. The metadata of the media content can include any information associated with the media content such as a name of the media content (e.g., "Insidious 2"), a file name of the media content, an ID of the media content, a length of the media content in terms of time, content provider details, or content originator details. Each block in a blockchain can have such details.

FIG. 4B is a block diagram of a blockchain 410 used to manage access transactions of a media content in the social networking system 105, consistent with various embodiments. The social networking system 105 can store access transactions associated with the media content 150 as blocks in a blockchain 410. In some embodiments, the social networking system 105 stores each access transaction as a separate block in the blockchain 410. For example, the access transaction corresponding to the first user 135 obtaining access from the content provider is stored as a third block 413 in the blockchain 410. The third block 413 has information such as (a) metadata of the media content 150 that is being shared (e.g., name of media content 150 as "Insidious 2"), (b) an ID of the content provider as the provider of access to the media content 150, (c) an ID of the first user 135 as a user to whom the access to the media content 150 is provided, and (d) price of the access type as (1 DC). The first block 411 is a genesis block of the blockchain 410, that is, the block 411 is the first in or a root of the blockchain 410. The genesis block 411 represents the transaction of the media content 150 being made available by the content originator (e.g., "Universal Studios") to the social networking system 105. The second block 412 represents the access transaction of the content provider (e.g., "Dish Network") buying the media content 150 from the content originator. The fourth block 414 represents the access transaction of the second user 140 obtaining the access to the media content 150 from the first user 135. All these blocks are linked in the blockchain 410 to represent the access transactions associated with the media content 150.

The social networking system 105 adds a specified access transaction to the blockchain 410 as a block after computing a hash for the specified transaction, validating the specified access transaction, e.g., by broadcasting the access transaction to a pee-to-peer (P2P) network, encrypts the validated access transaction, and adds the validated access transaction to the blockchain 410. The block is added to the blockchain 410 and linked to the previous block of the blockchain 410 by storing, in the block, a hash of the previous block (e.g., last added block) in the blockchain 410. For example, to add the access transaction associated with the second user 140, the access transaction is sent to the P2P network for validation. The P2P network consists of computers called as nodes. The network of nodes validates the access transaction and the user status using known algorithms. When a consensus is received, the access transaction is validated. Once validated, the access transaction is combined with other transactions to create a new block of data, e.g., the fourth block 414. The access transaction will be rejected and does not get linked to existing blocks in the blockchain 410 if the validation fails.

As described above, a hash is generated for a block prior to adding the block to the blockchain. In some embodiments, a hash is a fingerprint of the block and is always unique. Hash of the previous block is used to create chain of blocks and each block points to the previous block as illustrated in the blockchain 410. For example, to add the fourth block 414 to the blockchain 410, the social networking system 105 links the fourth block 414 to the third block 413 by adding a hash of the third block 413 in the fourth block 414. This type of linking ensures the blocks (e.g., transactions in the block) are secure. If a block is edited or tampered with, e.g., data in the block is changed, a new hash is created. And any further blocks cannot point to the previous block as the new hash of the previous block and a hash of the previous block in the next block does not match. For example, if a hacker tries to steal the cryptocurrency from the seller in the third block 413, tampering the data creates a new hash for the third block 413. The new hash of the third block 413 and the hash of the third block 413 stored in the fourth block 414 as previous hash do not match. Accordingly, the blockchain 410 ensures that the transactions between the entities in the social networking system 105 is secure. In some embodiments, the social networking system 105 can generate separate blockchains for different media content, e.g., a first blockchain to manage transactions associated with a first media content and a second blockchain to manage transactions associated with a second media content.

FIG. 4C is a block diagram of the blockchain illustrating payments made for obtaining access to media content, consistent with various embodiments. Continuing with the example described in FIG. 4B, the second user 140 can obtain access to the media content 150 from the first user 135 upon making a payment to the first user 135. To facilitate payments, in some embodiments, the social networking system 105 uses smart contracts in the blockchain 410. In some embodiments, a smart contract is a distributed ledger to store contracts and automatically exchange coins. A smart contract is implemented as a computer program that is stored inside a blockchain, and the smart contract holds the money. Once the file (media content 150) is transferred to the second user 140, the smart contract then transfers the coins to the seller, e.g., the first user 135. A smart contract is immutable (never be changed again) and it is distributed (output of contract is validated by everyone on the network). For example, when the second user 140 buys a movie from the first user 135, as per the smart contract, the coins paid by the second user 140 will be shared between the content provider and the first user 135 in which the content provider gets a first portion 425 and the first user 135 gets a second portion 430 of the coins.

Figure 5:
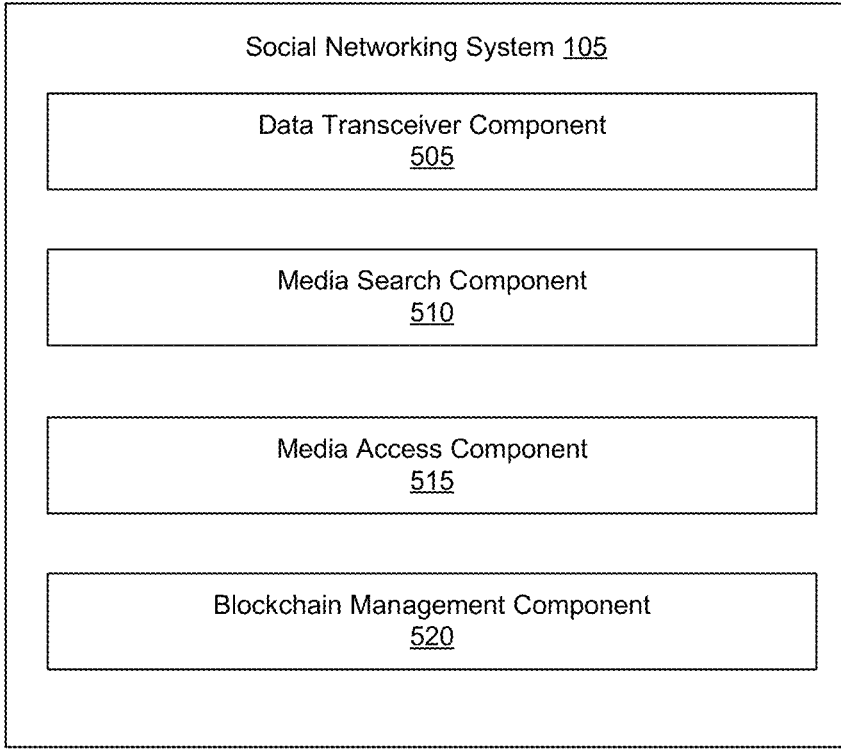
FIG. 5 is a block diagram of the social networking system, consistent with various embodiments.

FIG. 5 is a block diagram of the social networking system of FIG. 1, consistent with various embodiments. The social networking system 105 includes a number of components that facilitate in managing provision of access to media content to users of the social networking system 105. For example, the components include a data transceiver component 505, a media search component 510, a media access component 515, and a blockchain management component 520. The data transceiver component 505 receives a request for accessing media content from a user in the social networking system 105. The media search component 510 generates a GUI, which allows the user to search for media content in the social networking system 105 and presents the user with various entities from who the user can obtain the access to the media content.

The media access component 515 facilitates providing access to the media content from the entity chosen by the user. The media access component 515 also facilitates the payment between the entities for sharing the access.

The blockchain management component 520 uses the blockchain technology to generate blocks of access transactions, e.g., as described at least with reference to FIGS. 4A-4C.

Additional details with respect to the components of the social networking system 105 are described at least with reference to FIGS. 6 and 7 below. Note that the social networking system 105 illustrated in FIG. 5 is not restricted to having the above described components. The social networking system 105 can include lesser number of components, e.g., functionalities of two components can be combined into one component, or can include more number of components, e.g., components that perform other functionalities. In some embodiments, the functionalities of one or more of the above components can be split into two or more components. Furthermore, the components of the social networking system 105 can be implemented at a single computing device or distributed across multiple computing devices.

FIG. 6 is a flow diagram of a process 600 for managing access transactions associated with sharing a media content using a blockchain, consistent with various embodiments. In some embodiments, the process 600 can be implemented in the environment 100. At block 605, the blockchain management component 520 receives a transaction associated with accessing media content in a social networking system. The transaction can correspond to at least one of renting, sharing or buying the media content by one user from another user of the social networking system 105. For example, the transaction can correspond to the second user 140 renting the media content 150 from the first user 135.

At block 610, the blockchain management component 520 validates the specified transaction. As described at least with reference to FIG. 4B, the specified transaction is validated by a network of P2P computer nodes. The P2P network can analyze the transaction data such as the seller, buyer, the price associated with the access type for validating the transaction. The P2P network can use any of a number of methods used for validating a transaction in blockchain technology.

At block 615, the blockchain management component 520 stores the validated transaction as a specified block in the blockchain. For example, the blockchain management component 520 stores the specified block as the fourth block 414 in the blockchain 410. In some embodiments, storing the specified block in the blockchain includes linking the specified block to the last added block of the blockchain by storing a hash of the last added block in the specified block. For example, storing the fourth block 414 in the blockchain 410 includes linking the fourth block 414 to the third block 413 by storing a hash of the third block 413 in the fourth block 414.

At block 620, the blockchain management component 520 executes a smart contract associated with the transaction. As described at least with reference to FIG. 4C, a smart contract is a distributed ledger to store contracts and automatically exchange coins. A smart contract is implemented as a computer program that is stored inside a blockchain, and the smart contract holds the money. For example, the smart contract for the specified transaction can indicate that the second user 140 has to pay "0.7 DC" for renting the media content 150 from the first user 135 out of which a portion, e.g., "0.3 DC," goes to the content provider and the remaining to the first user 135.

At block 625, the media access component 515 provides access to the media content to the second user. In some embodiments, the media access component 515 may provide a link, which the second user can use to access the media content. For example, the media access component 515 provides a link to the media content 150 to the second user 140 using which the second user 140 can stream or download the media content 150 from the provider cloud service 125.

FIG. 7 is a flow diagram of a process 700 for sharing access to media content with users of the social networking system, consistent with various embodiments. In some embodiments, the process 700 can be implemented in the environment 100 of FIG. 1. At block 705, the data transceiver component 505 receives a request for accessing a specified media content from a specified user of the social networking system. For example, the request can be from the second user 140 for accessing the media content 150.

At block 710, the media search component 510 determines a set of users in the social networking system 105 who have access to the specified media content. In some embodiments, the media access component 515 keeps track of the users who have access to the specified media component, e.g., by analyzing the blockchain associated with the media content. For example, the media search component 510 determines the set of users who have access to the media content 150 by analyzing the blockchain 410.

At block 715, the media search component 510 generate a list of entities having access to the specified media content. For example, the media search component 510 generates a list of entities having access to the media content 150 as illustrated in the GUI 200 of FIG. 2. The GUI 200 also has other information such as access type provided by each of the entities and price for each of the access types.

At block 720, the media search component 510 receives an indication from the specified user for obtaining the access to the media content from a first user of the social networking system 105. In some embodiments, the first user is a friend, follower or otherwise connected to the specified user in the social networking system. For example, the media search component 510 receives an indication from the second user 140 that the second user 140 would like to obtain the access for the media content 150 from the first user 135 (who is a friend of the second user 140 in the social networking system 105).

At block 725, the media access component 515 provides access to the media content to the specified user in exchange for a coin. For example, the media access component 515 provides a link to the media content 150 to the second user 140 using which the second user 140 can stream or download the media content 150 from the provider cloud service 125. In some embodiments, the media access component 515 can also facilitate the specified user to pay for accessing the media content. The payment can be made in fiat currency or a cryptocurrency, such as a coin associated with the content provider or the content originator. In some embodiments, the payment is made in cryptocurrency. For example, the media access component 515 facilitates the second user 140 to pay "0.7DC" for renting the media content 150 from the first user 135.

Figure 8:
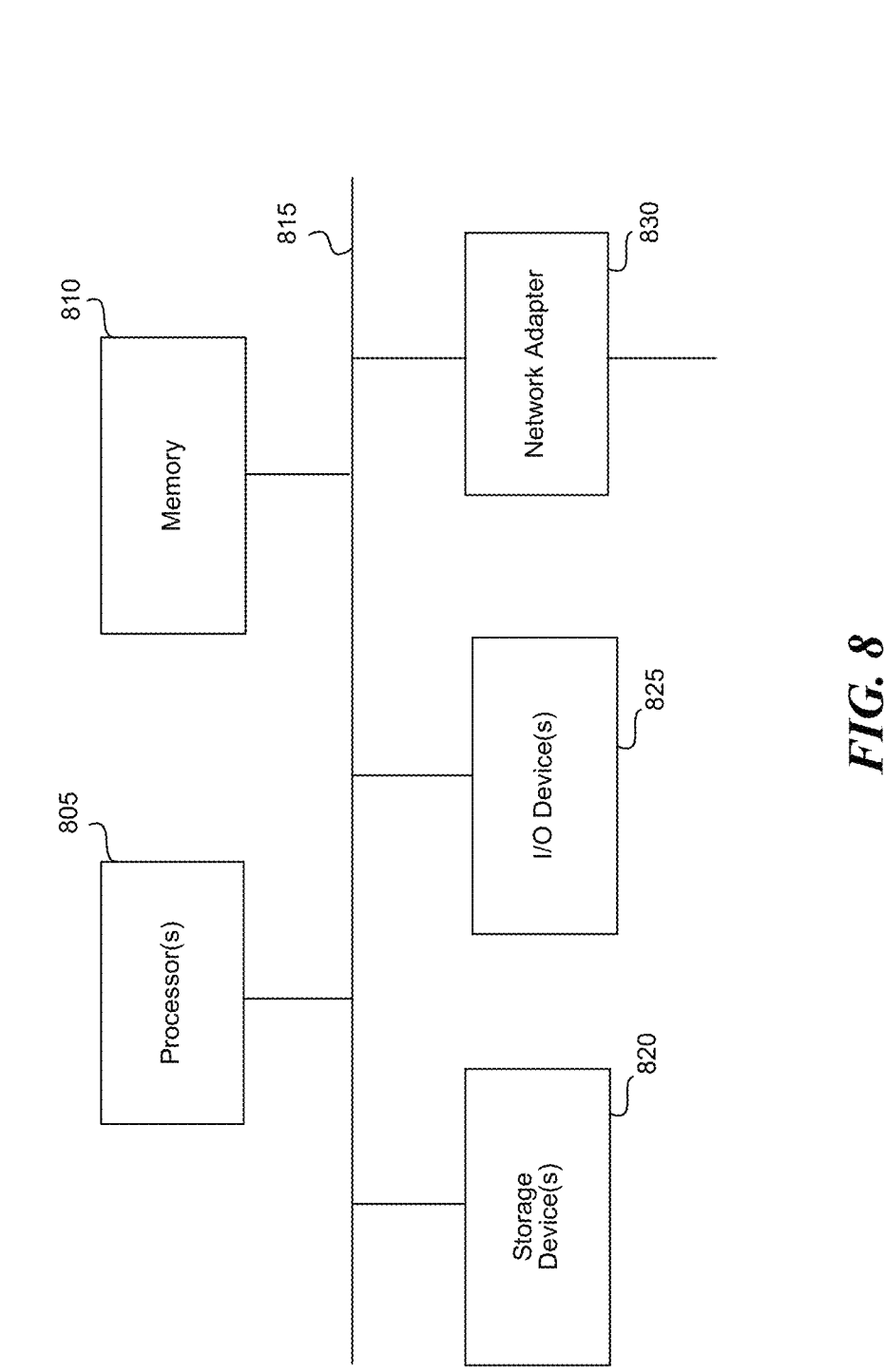
FIG. 8 is a block diagram of a processing system that can implement operations of the disclosed embodiments.

FIG. 8 is a block diagram of a computer system as may be used to implement features of the disclosed embodiments. The computing system 800 may be used to implement any of the entities, components or services depicted in the examples of the foregoing figures (and any other components described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 810 and storage devices 820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method comprising:
receiving, at a computer system, a specified transaction associated with accessing media content in a social networking system;
validating, at the computer system, the specified transaction to generate a validated transaction;
in response to the validating, storing, by the computer system, the validated transaction as a specified block in a blockchain to be accessible by a content provider;
in response to a determination that a first user watched at least a portion of a media content, permitting the first user to provide access to the media content to a second user in exchange for a cost,
wherein a first portion of the cost is paid by the second user to the content provider with a type of coin specified by the content provider,
wherein a second portion of the cost is paid by the second user to the first user;
provisioning, by the computer system, access to the media content to the second user;
executing, upon the specified transaction being validated, an executable program stored in the blockchain to exchange at least one coin by the second user with the first user for access to the media content; and
transferring at least a first portion of the at least one coin to the content provider and a second portion of the at least one coin to the first user.

2. The method of claim 1, further comprising:
sending the specified transaction to a network of multiple computing devices; and
receiving, at the computer system, a consensus on validation of the specified transaction.

3. The method of claim 1, further comprising:
storing, by the computer system, information regarding (a) entities involved in the specified transaction, (b) metadata of the media content, and (c) a price of the media content for the specified transaction in the specified block; and
generating, at the computer system, a hash of the specified block.

4. The method of claim 1, further comprising:
storing the specified block in the blockchain by linking the specified block to a last added block of the blockchain, wherein the linking includes storing a hash of the last added block in the specified block.

5. The method of claim 1, further comprising:
storing the specified block in the blockchain by linking the specified block to a provider block of the blockchain, wherein the linking includes storing a hash of the provider block in the specified block.

6. The method of claim 1, further comprising:
obtaining the media content from the content provider;
hosting the media content in a cloud storage service associated with the content provider; and
providing access to the media content to users of a social networking platform.

7. The method of claim 1, further comprising:

provisioning the access from a cloud storage service associated with the content provider, wherein the cloud storage service stores multiple media content.

8. A system comprising:

one or more processors; and one or more memories storing instructions that, when executed by the one or more processors, cause the system to perform a process comprising:

receiving a specified transaction associated with accessing media content in a social networking system;

validating the specified transaction to generate a validated transaction;

in response to the validating, storing the validated transaction as a specified block in a blockchain to be accessible by a content provider;

in response to a determination that a first user watched at least a portion of a media content, permitting the first user to provide access to the media content to a second user in exchange for a cost, wherein a first portion of the cost is paid by the second user to the content provider with a type of coin specified by the content provider, wherein a second portion of the cost is paid by the second user to the first user;

provisioning access to the media content to the second user;

executing, upon the specified transaction being validated, an executable program stored in the blockchain to exchange at least one coin by the second user with the first user for access to the media content; and transferring at least a first portion of the at least one coin to the content provider and a second portion of the at least one coin to the first user.

9. The system of claim 8, wherein the process further comprises:

sending the specified transaction to a network of multiple computing devices; and receiving a consensus on validation of the specified transaction.

10. The system of claim 8, wherein the process further comprises:

storing information regarding (a) entities involved in the specified transaction, (b) metadata of the media content, and (c) a price of the media content for the specified transaction in the specified block; and generating a hash of the specified block.

11. The system of claim 8, wherein the process further comprises:

storing the specified block in the blockchain by linking the specified block to a last added block of the blockchain, wherein the linking includes storing a hash of the last added block in the specified block.

12. The system of claim 8, wherein the process further comprises:

storing the specified block in the blockchain by linking the specified block to a provider block of the blockchain, wherein the linking includes storing a hash of the provider block in the specified block.

13. The system of claim 8, wherein the process further comprises:

obtaining the media content from the content provider;

hosting the media content in a cloud storage service associated with the content provider; and providing access to the media content to users of a social networking platform.

14. The system of claim 8, wherein the process further comprises:

provisioning the access from a cloud storage service associated with the content provider, wherein the cloud storage service stores multiple media content.

15. A non-transitory computer-readable medium storing instructions that, when executed by a computing system, cause the computing system to perform operations comprising:

receiving a specified transaction associated with accessing media content in a social networking system;

validating the specified transaction to generate a validated transaction;

in response to the validating, storing the validated transaction as a specified block in a blockchain to be accessible by a content provider;

in response to a determination that a first user watched at least a portion of a media content, permitting the first user to provide access to the media content to a second user in exchange for a cost, wherein a first portion of the cost is paid by the second user to the content provider with a type of coin specified by the content provider, wherein a second portion of the cost is paid by the second user to the first user;

provisioning access to the media content to the second user;

executing, upon the specified transaction being validated, an executable program stored in the blockchain to exchange at least one coin by the second user with the first user for access to the media content; and transferring at least a first portion of the at least one coin to the content provider and a second portion of the at least one coin to the first user.

16. The non-transitory computer-readable medium of claim 15, wherein the operations further comprise:

sending the specified transaction to a network of multiple computing devices; and receiving a consensus on validation of the specified transaction.

17. The non-transitory computer-readable medium of claim 15, wherein the operations further comprise:

storing information regarding (a) entities involved in the specified transaction, (b) metadata of the media content, and (c) a price of the media content for the specified transaction in the specified block; and generating a hash of the specified block.

18. The non-transitory computer-readable medium of claim 15, wherein the operations further comprise:

storing the specified block in the blockchain by linking the specified block to a last added block of the blockchain, wherein the linking includes storing a hash of the last added block in the specified block.

19. The non-transitory computer-readable medium of claim 15, wherein the operations further comprise:

storing the specified block in the blockchain by linking the specified block to a provider block of the blockchain, wherein the linking includes storing a hash of the provider block in the specified block.

20. The non-transitory computer-readable medium of claim 15, wherein the operations further comprise:

obtaining the media content from the content provider;

hosting the media content in a cloud storage service associated with the content provider; and providing access to the media content to users of a social networking platform.

* * * * *